(12) United States Patent
Shveidel et al.

(10) Patent No.: US 12,118,214 B2
(45) Date of Patent: Oct. 15, 2024

(54) STORAGE AND METHOD FOR ADAPTIVE FLUSHING IN LOG STRUCTURED STORAGE SYSTEMS

(71) Applicant: Dell Products L.P., Round Rock, TX (US)

(72) Inventors: Vladimir Shveidel, Pardes-Hana (IL); Geng Han, Beijing (CN); Jibing Dong, Beijing (CN)

(73) Assignee: Dell Products L.P., Round Rock, TX (US)

( * ) Notice: Subject to any disclaimer, the term of this patent is extended or adjusted under 35 U.S.C. 154(b) by 73 days.

(21) Appl. No.: 18/161,139

(22) Filed: Jan. 30, 2023

(65) Prior Publication Data

US 2024/0256129 A1  Aug. 1, 2024

(51) Int. Cl.
*G06F 3/06* (2006.01)

(52) U.S. Cl.
CPC ............ *G06F 3/061* (2013.01); *G06F 3/0652* (2013.01); *G06F 3/067* (2013.01)

(58) Field of Classification Search
None
See application file for complete search history.

(56) References Cited

U.S. PATENT DOCUMENTS

| | | | | |
|---|---|---|---|---|
| 11,409,454 | B1 * | 8/2022 | Shveidel | G06F 3/0635 |
| 11,620,062 | B1 * | 4/2023 | Shveidel | G06F 3/064 |
| | | | | 711/154 |
| 11,886,427 | B1 * | 1/2024 | Shveidel | G06F 16/2379 |
| 2023/0106982 | A1 * | 4/2023 | David | G06F 3/0637 |
| | | | | 707/704 |
| 2023/0137146 | A1 * | 5/2023 | Liu | H04L 67/1097 |
| | | | | 711/113 |
| 2023/0229332 | A1 * | 7/2023 | Shveidel | G06F 3/061 |
| | | | | 711/153 |
| 2023/0342079 | A1 * | 10/2023 | Shveidel | G06F 3/061 |
| 2023/0409218 | A1 * | 12/2023 | Shveidel | G06F 3/0631 |
| 2024/0004569 | A1 * | 1/2024 | Shveidel | G06F 3/0659 |
| 2024/0020225 | A1 * | 1/2024 | Shveidel | G06F 12/0888 |
| 2024/0028251 | A1 * | 1/2024 | David | G06F 3/0655 |
| 2024/0134524 | A1 * | 4/2024 | Han | G06F 3/061 |

* cited by examiner

*Primary Examiner* — Kevin Verbrugge
(74) *Attorney, Agent, or Firm* — Brian J. Colandreo; Heath M. Sargeant; Holland & Knight LLP (57) ABSTRACT

A method, computer program product, and computing system for monitoring data reduction information concerning a plurality of containers from a flush working set within a log memory system of a storage system, wherein the plurality of containers are associated with a storage object. An assigned working set size may be determined for a flusher based upon, at least in part, the data reduction information. The assigned working set may be generated for the flusher by adding one or more containers from the flush working set to the assigned working set based upon, at least in part, the assigned working set size. The one or more containers may be flushed, using the flusher, from the assigned working set to persistent memory within the storage system.

20 Claims, 6 Drawing Sheets

STORAGE AND METHOD FOR ADAPTIVE FLUSHING IN LOG STRUCTURED STORAGE SYSTEMS

BACKGROUND

Storing and safeguarding electronic content may be beneficial in modern business and elsewhere. Accordingly, various methodologies may be employed to protect and distribute such electronic content.

For example, modern storage clusters use a data journal or log memory system to optimize write operation latency. First, the data received from a client is persisted in the log memory system that is located in non-volatile random access memory (NVRAM) or other fast media. Once the data is successfully persisted, the storage cluster takes full responsibility on its consistency and acknowledges the client. The last step is generally asynchronous data flushing where the data is destaged from the log memory system to a final location in persistent memory and the log memory space is reclaimed for reuse.

Data flushing from the log memory system is generally performed by a set of parallel flushers, where each of the flushers receive a set of data pages to flush. Once the flusher has data pages assigned, the flusher performs flushing dependently on page types/classification. However, the flusher flow generally has the following constraints and requirements: each flusher receives a RAID stripe of fixed size defined by RAID architecture (e.g., a two-megabyte physical layer block) for writing unique data. This stripe cannot be shared with other flushers, and the stripe generally should be written in one shot/transaction, since split writing is associated with noticeable RAID level overheads (i.e., re-calculating and rewriting parity blocks, etc.). Typically, the flusher will attempt to provide the best possible data reduction. As such, the flusher will attempt to perform deduplication of the data and compression of the data before writing to the stripe.

Generally, if the data pages cannot be accommodated inside the assigned RAID stripe, the remainder of the non-flushed pages are returned for further assigning and flushing, which is a very expensive operation (performance-wise) and also it reduces flush scalability by reducing effective assignable log content.

Accordingly, the cost of assigning over-sized working sets (i.e., sets of data pages that cannot be accommodated in one stripe) to a flusher is very significant. Conventional approaches define a default or standard amount of data pages to assign to a flusher by calculating the number of pages based upon the most common or average workload (i.e., the most common deduplication ratio and compression ratio) that provides full stripe filling. However, there are significant drawbacks for these approaches: the stripe is fully utilized only when the characteristics of the working set match the most common working sets. At the same time, both the deduplication and compression ratios may be very different depending on application, volume, specific time, etc. Moreover, even if average per-cluster characteristics are very close to the most common, this does not guarantee that flushers are fully optimized.

SUMMARY OF DISCLOSURE

In one example implementation, a computer-implemented method executed on a computing device may include, but is not limited to, monitoring data reduction information concerning a plurality of containers from a flush working set within a log memory system of a storage system, wherein the plurality of containers are associated with a storage object. An assigned working set size may be determined for a flusher based upon, at least in part, the data reduction information. The assigned working set may be generated for the flusher by adding one or more containers from the flush working set to the assigned working set based upon, at least in part, the assigned working set size. The one or more containers may be flushed, using the flusher, from the assigned working set to persistent memory within the storage system.

One or more of the following example features may be included. Monitoring the data reduction information concerning the plurality of containers may include determining a total number of pages in each container associated with the storage object. Monitoring the data reduction information concerning the plurality of containers may include determining a total number of deduplicated pages in each container associated with the storage object. Monitoring the data reduction information concerning the plurality of containers may include determining a cumulative size of compressed pages in each container associated with the storage object. Determining the assigned working set size for the flusher may include: determining a storage object deduplication ratio based upon, at least in part, the total number of pages and the total number of deduplicated pages in each container; and determining a storage object compression ratio based upon, at least in part, the total number of pages, the cumulative size of compressed pages, and the total number of deduplicated pages in each container. Determining the assigned working set size for the flusher may include determining a predefined persistent memory capacity associated with the assigned working set. Generating the assigned working set for the flusher may include adding containers to the assigned working set up to the predefined persistent memory capacity associated with the assigned working set.

In another example implementation, a computer program product resides on a computer readable medium that has a plurality of instructions stored on it. When executed by a processor, the instructions cause the processor to perform operations that may include, but are not limited to, monitoring data reduction information concerning a plurality of containers from a flush working set within a log memory system of a storage system, wherein the plurality of containers are associated with a storage object. An assigned working set size may be determined for a flusher based upon, at least in part, the data reduction information. The assigned working set may be generated for the flusher by adding one or more containers from the flush working set to the assigned working set based upon, at least in part, the assigned working set size. The one or more containers may be flushed, using the flusher, from the assigned working set to persistent memory within the storage system.

One or more of the following example features may be included. Monitoring the data reduction information concerning the plurality of containers may include determining a total number of pages in each container associated with the storage object. Monitoring the data reduction information concerning the plurality of containers may include determining a total number of deduplicated pages in each container associated with the storage object. Monitoring the data reduction information concerning the plurality of containers may include determining a cumulative size of compressed pages in each container associated with the storage object. Determining the assigned working set size for the flusher may include: determining a storage object deduplication ratio based upon, at least in part, the total number of pages and the total number of deduplicated pages in each container; and determining a storage object compression ratio based upon, at least in part, the total number of pages, the cumulative size of compressed pages, and the total number of deduplicated pages in each container. Determining the assigned working set size for the flusher may include determining a predefined persistent memory capacity associated with the assigned working set. Generating the assigned working set for the flusher may include adding containers to the assigned working set up to the predefined persistent memory capacity associated with the assigned working set.

In another example implementation, a computing system includes at least one processor and at least one memory architecture coupled with the at least one processor, wherein the at least one processor configured to monitor data reduction information concerning a plurality of containers from a flush working set within a log memory system of a storage system, wherein the plurality of containers are associated with a storage object. An assigned working set size may be determined for a flusher based upon, at least in part, the data reduction information. The assigned working set may be generated for the flusher by adding one or more containers from the flush working set to the assigned working set based upon, at least in part, the assigned working set size. The one or more containers may be flushed, using the flusher, from the assigned working set to persistent memory within the storage system.

One or more of the following example features may be included. Monitoring the data reduction information concerning the plurality of containers may include determining a total number of pages in each container associated with the storage object. Monitoring the data reduction information concerning the plurality of containers may include determining a total number of deduplicated pages in each container associated with the storage object. Monitoring the data reduction information concerning the plurality of containers may include determining a cumulative size of compressed pages in each container associated with the storage object. Determining the assigned working set size for the flusher may include: determining a storage object deduplication ratio based upon, at least in part, the total number of pages and the total number of deduplicated pages in each container; and determining a storage object compression ratio based upon, at least in part, the total number of pages, the cumulative size of compressed pages, and the total number of deduplicated pages in each container. Determining the assigned working set size for the flusher may include determining a predefined persistent memory capacity associated with the assigned working set. Generating the assigned working set for the flusher may include adding containers to the assigned working set up to the predefined persistent memory capacity associated with the assigned working set.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
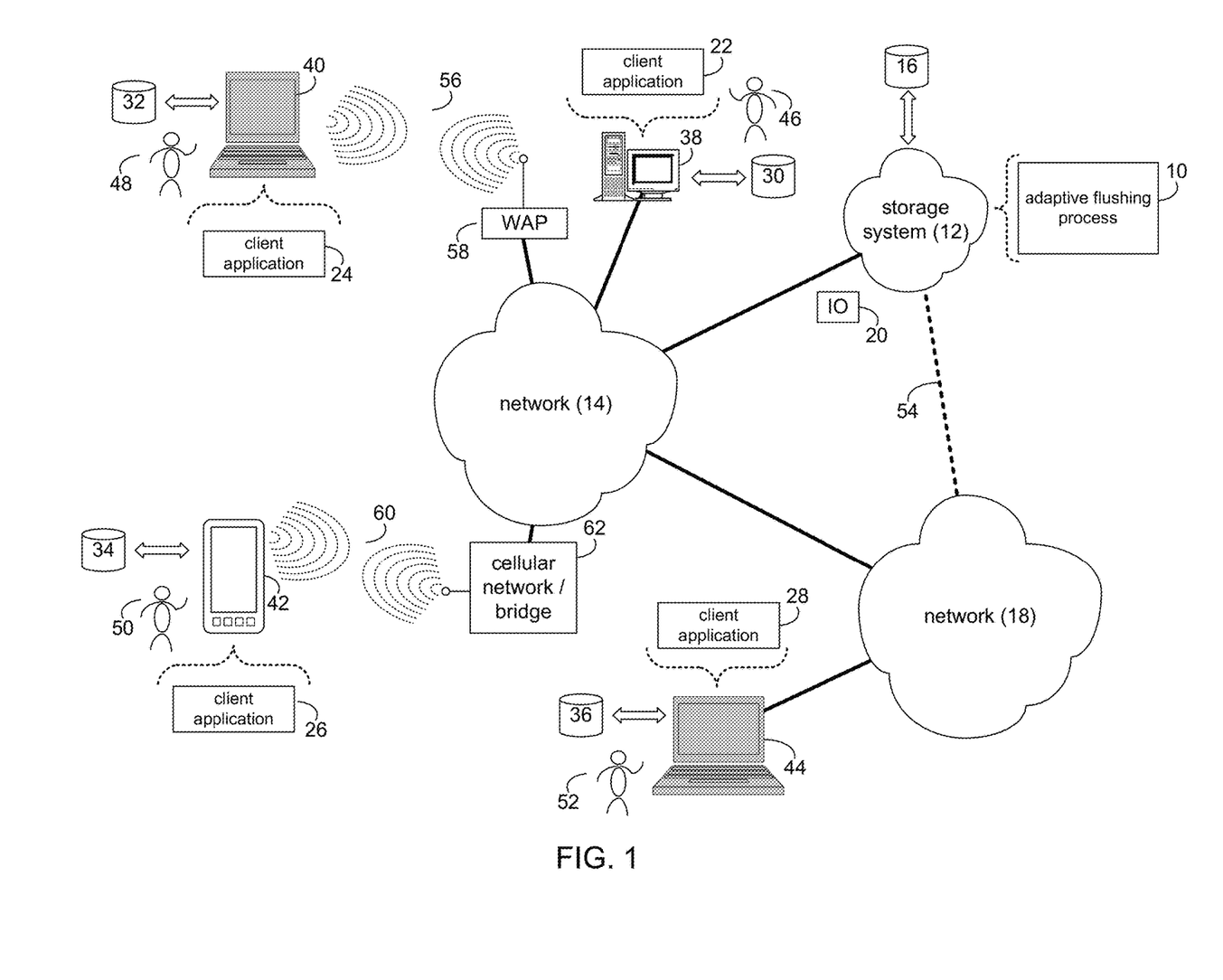
FIG. 1 is an example diagrammatic view of a storage system and an adaptive flushing process coupled to a distributed computing network according to one or more example implementations of the disclosure.

System Overview:

Referring to FIG. 1, there is shown adaptive flushing process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of adaptive flushing process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of adaptive flushing process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a adaptive flushing process, such as adaptive flushing process 10 of FIG. 1, may include but is not limited to, monitoring data reduction information concerning a plurality of containers from a flush working set within a log memory system of a storage system, wherein the plurality of containers are associated with a storage object. An assigned working set size may be determined for a flusher based upon, at least in part, the data reduction information. The assigned working set may be generated for the flusher by adding one or more containers from the flush working set to the assigned working set based upon, at least in part, the assigned working set size. The one or more containers may be flushed, using the flusher, from the assigned working set to persistent memory within the storage system.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
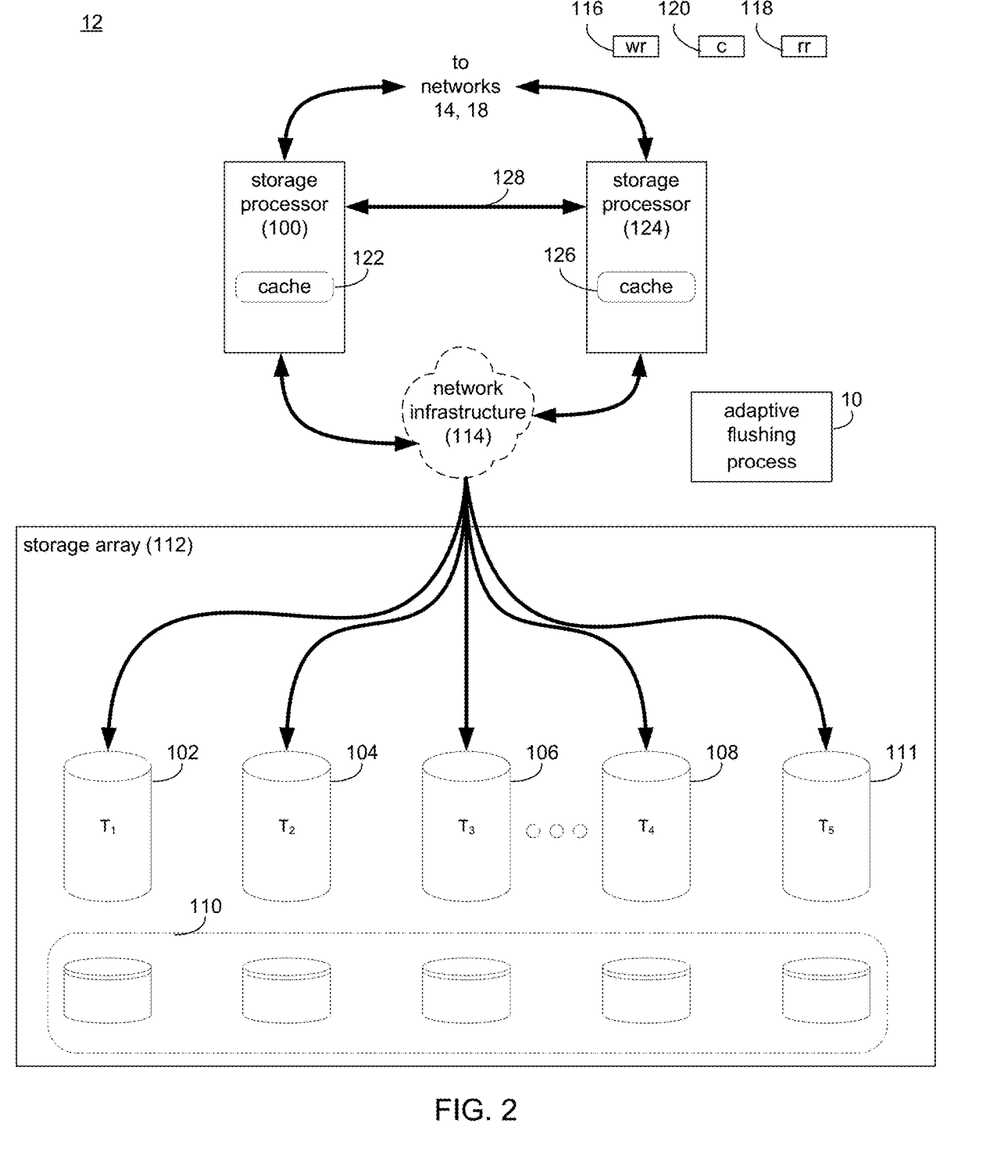
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-$n$ (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage devices (e.g., storage devices 110) used to create the storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage devices used to create the storage targets. By mirroring data between storage devices, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 111. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 111), this is for example purposes only and is not intended to be a limitation of this disclosure. Specifically, the actual number of coded targets may be increased or decreased depending upon e.g. the level of redundancy/performance/capacity required.

Storage targets 102, 104, 106, 108 and coded target 111 may be created as volumes using one or more electro-mechanical hard disk drives and/or solid-state/flash devices (e.g., storage devices 110), wherein a combination of storage targets 102, 104, 106, 108 and coded target 111 and processing/control systems (not shown) may form data array 112.

The manner in which storage system 12 is implemented may vary depending upon e.g. the level of redundancy/ performance/capacity required. For example, storage system 12 may be a RAID device in which storage processor 100 is a RAID controller card and storage targets 102, 104, 106, 108 and/or coded target 111 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 111 may be a RAID device and/or computer-based hard disk drives. Further still, one or more of storage targets 102, 104, 106, 108 and/or coded target 111 may be a SAN.

In the event that storage system 12 is configured as a SAN, the various components of storage system 12 (e.g. storage processor 100, storage targets 102, 104, 106, 108, and coded target 111) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of adaptive flushing process 10. The instruction sets and subroutines of adaptive flushing process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of adaptive flushing process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

As discussed above, the instruction sets and subroutines of adaptive flushing process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of adaptive flushing process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 124), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 124 may function like storage processor 100. For example, during operation of storage processor 124, content 118 to be written to storage system 12 may be processed by storage processor 124. Additionally/alternatively and when storage processor 124 is configured as an application server, content 118 to be written to storage system 12 may be internally generated by storage processor 124.

Storage processor 124 may include frontend cache memory system 126. Examples of frontend cache memory system 126 may include but are not limited to a volatile, solid-state, cache memory system (e.g., a dynamic RAM cache memory system) and/or a non-volatile, solid-state, cache memory system (e.g., a flash-based, cache memory system).

Storage processor 124 may initially store content 118 within frontend cache memory system 124. Depending upon the manner in which frontend cache memory system 126 is configured, storage processor 124 may immediately write content 118 to data array 112 (if frontend cache memory system 126 is configured as a write-through cache) or may subsequently write content 118 to data array 112 (if frontend cache memory system 126 is configured as a write-back cache).

In some implementations, the instruction sets and subroutines of adaptive flushing process 10, which may be stored on storage device 16 included within storage system 12, may be executed by one or more processors (not shown) and one or more memory architectures (not shown) included within storage system 12. Accordingly, in addition to being executed on storage processor 124, some or all of the instruction sets and subroutines of adaptive flushing process 10 may be executed by one or more processors (not shown) and one or more memory architectures (not shown) included within data array 112.

Further and as discussed above, during the operation of data array 112, content (e.g., content 118) to be written to data array 112 may be received from storage processor 124 and initially stored within backend cache memory system 124 prior to being stored on e.g. one or more of storage targets 102, 104, 106, 108, 111. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

As discussed above, storage processor 100 and storage processor 124 may be configured in an active/active configuration where processing of data by one storage processor may be synchronized to the other storage processor. For example, data may be synchronized between each storage processor via a separate link or connection (e.g., connection 128).

The Adaptive Flushing Process:

Referring also to the examples of FIGS. 3-6 and in some implementations, adaptive flushing process 10 may monitor 300 data reduction information concerning a plurality of containers from a flush working set within a log memory system of a storage system, wherein the plurality of containers are associated with a storage object. An assigned working set size may be determined 302 for a flusher based upon, at least in part, the data reduction information. The assigned working set may be generated 304 for the flusher by adding one or more containers from the flush working set to the assigned working set based upon, at least in part, the assigned working set size. The one or more containers may be flushed 306, using the flusher, from the assigned working set to persistent memory within the storage system.

As will be discussed in greater detail below, implementations of the present disclosure may allow for adaptive assignment of pages from a log memory system into working sets of flushers to optimize flushing from a log memory system to persistent storage. For example, modern storage clusters use a data journal or log memory system to optimize write operation latency. First, the data received from a client is persisted in the log memory system that is located in non-volatile random access memory (NVRAM) or other fast media. Once the data is successfully persisted, the storage cluster takes full responsibility on its consistency and acknowledges the client. The last step is generally asynchronous data flushing where the data is destaged from the log memory system to a final location in persistent memory and the log memory space is reclaimed for reuse.

Data flushing from the log memory system is generally performed by a set of parallel flushers, where each of the flushers receive a set of data pages to flush. Once the flusher has data pages assigned, the flusher performs flushing dependently on page types/classification. However, the flusher flow typically has the following constraints and requirements: each flusher receives a RAID stripe of fixed size defined by RAID architecture (e.g., two-megabyte physical layer block) for writing unique data. This stripe cannot be shared with other flushers, and the stripe generally should be written in one shot/transaction, since split writing is associated with noticeable RAID level overheads (i.e., re-calculating and rewriting parity blocks, etc.). Typically, the flusher will attempt to provide the best possible data reduction. As such, the flusher will attempt to perform deduplication of the data and compression of the data before writing to the stripe.

Generally, if the data pages cannot be accommodated inside the assigned RAID stripe, the remainder of the non-flushed pages are returned for further assigning and flushing, which is a very expensive operation (performance-wise) and also it reduces flush scalability by reducing effective assignable log content.

Accordingly, the cost of assigning over-sized working sets (i.e., sets of data pages that cannot be accommodated in one stripe) to a flusher is very significant. Conventional approaches define a default or standard amount of data pages to assign to a flusher by calculating the number of pages based upon the most common or average workload (i.e., the most common deduplication ratio and compression ratio) that provides full stripe filling. However, there are significant drawbacks for these approaches: the stripe is fully utilized only when the characteristics of the working set match the most common working sets. At the same time, both the deduplication and compression ratios may be very different depending on application, volume, specific time, etc. Moreover, even if average per-cluster characteristics are very close to the most common, this does not guarantee that flushers are fully optimized. Consider an example scenario where the working set size calculation is done with the assumption that the most common compression ratio is e.g., 2:1 and that the workload is divided between two volumes where one is highly compressible (e.g., 4:1) and the other is uncompressible (i.e., 1:1). In this case, the average compression ratio may easily be the same as the most common. However, since flushing is optimized with data locality assumption (LBA & Volume), some flushers will get pages mostly from the first volume, and their stripe will be highly underutilized (i.e., not full) while another flusher gets pages mostly from the second, uncompressible volume and will not be able to accommodate all the pages in one stripe. To address these challenges, implementations of the present disclosure provide high stripe utilization with adaptive flushing in log-structured storage.

Figure 4:
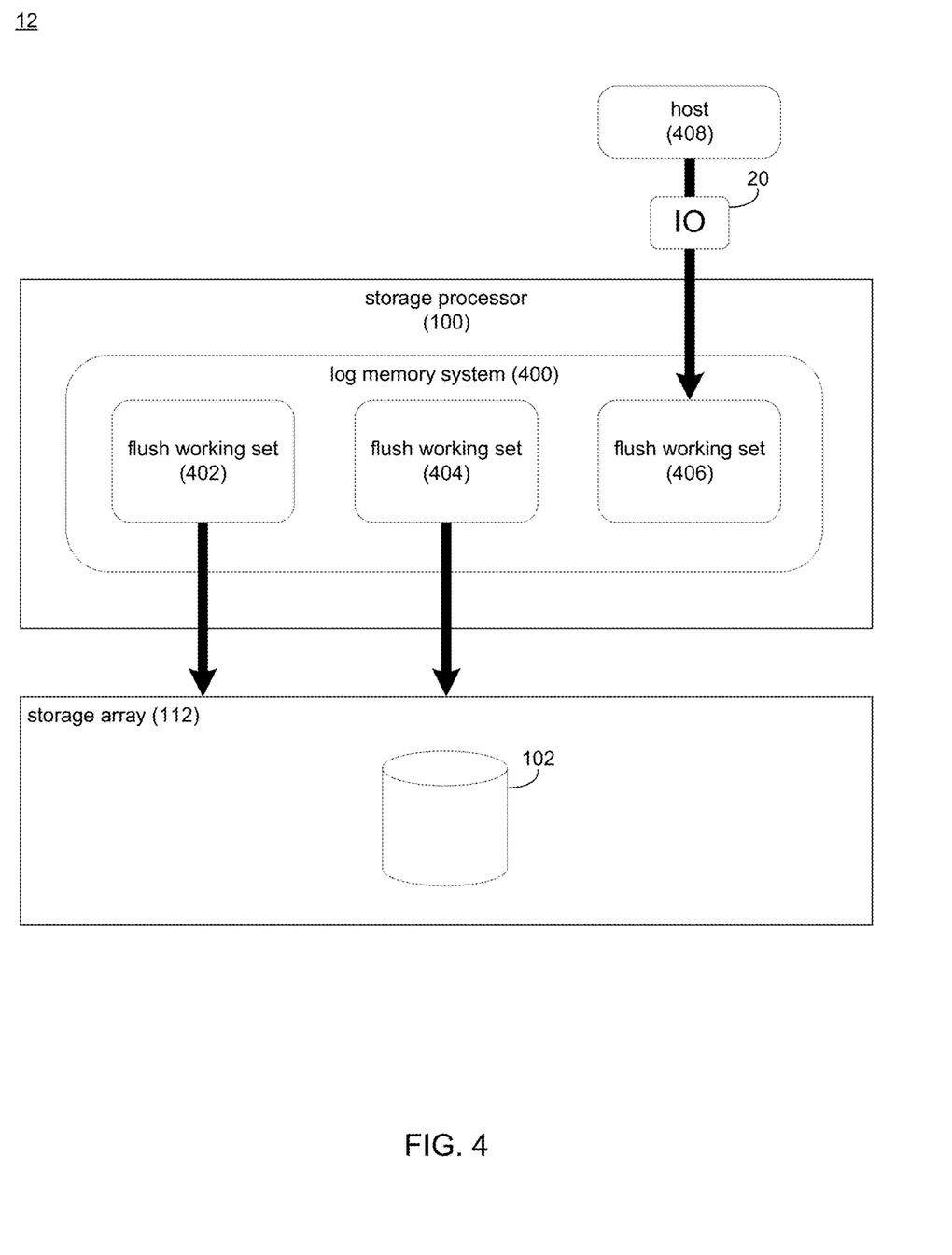
FIG. 4 is an example diagrammatic view of the storage system of FIG. 1 according to one or more example implementations of the disclosure.

Referring also to FIG. 4, storage processor 100 may include a log memory system (e.g., log memory system 400). In some implementations, log memory system 400 may include a plurality of flush working sets. A flush working set is a portion of memory within the log memory system for aggregating data to be flushed to persistent memory of the storage system (e.g., to a storage object within the storage array). In some implementations, a flush working set is formed from a pool of memory that is allocated for storing "dirty" data (i.e., data that needs to be flushed). As will be discussed in greater detail below, multiple flush working sets may be used to aggregate and flush dirty pages to persistent storage in batches. As shown in FIG. 4, suppose storage processor 100 includes a plurality of flush working sets (e.g., flush working sets 402, 404, 406). In some implementations, a host (e.g., host 408) sends IO requests (e.g., IO 20) to storage processor 100 for processing in persistent storage of the storage array (e.g., storage array 114). Adaptive flushing process 10 may initially or first add dirty data associated with IO requests to flush working set 402 within log memory system 400. Once flush working set 402 is full or reaches some predefined threshold, adaptive flushing process 10 "freezes" flush working set 402 from receiving further dirty data and begins to aggregate dirty data in flush working set 404. Once frozen, adaptive flushing process 10 flushes the dirty data from flush working set 402 to storage array 112. Adaptive flushing process 10 continues to aggregate dirty data in flush working set 404 until flush working set 404 is full or reaches a predefined storage capacity. Adaptive flushing process 10 freezes flush working set 404 and aggregates new dirty data in flush working set 406.

As flushing data from a frozen flush working set typically takes more time than adding dirty data to the active flush working set, multiple flush working sets may be frozen at one time. As shown in FIG. 4, flush working sets 402, 404 are frozen and flush working set 406 is actively receiving dirty data. Adaptive flushing process 10 flushes dirty data from flush working sets 402, 404 to persistent storage in storage array 112. Conventional approaches to processing dirty data with flush working sets require the entirety of a frozen flush working set to be flushed before reallocating any memory assigned to another flush working set or for other memory needs.

Figure 5:
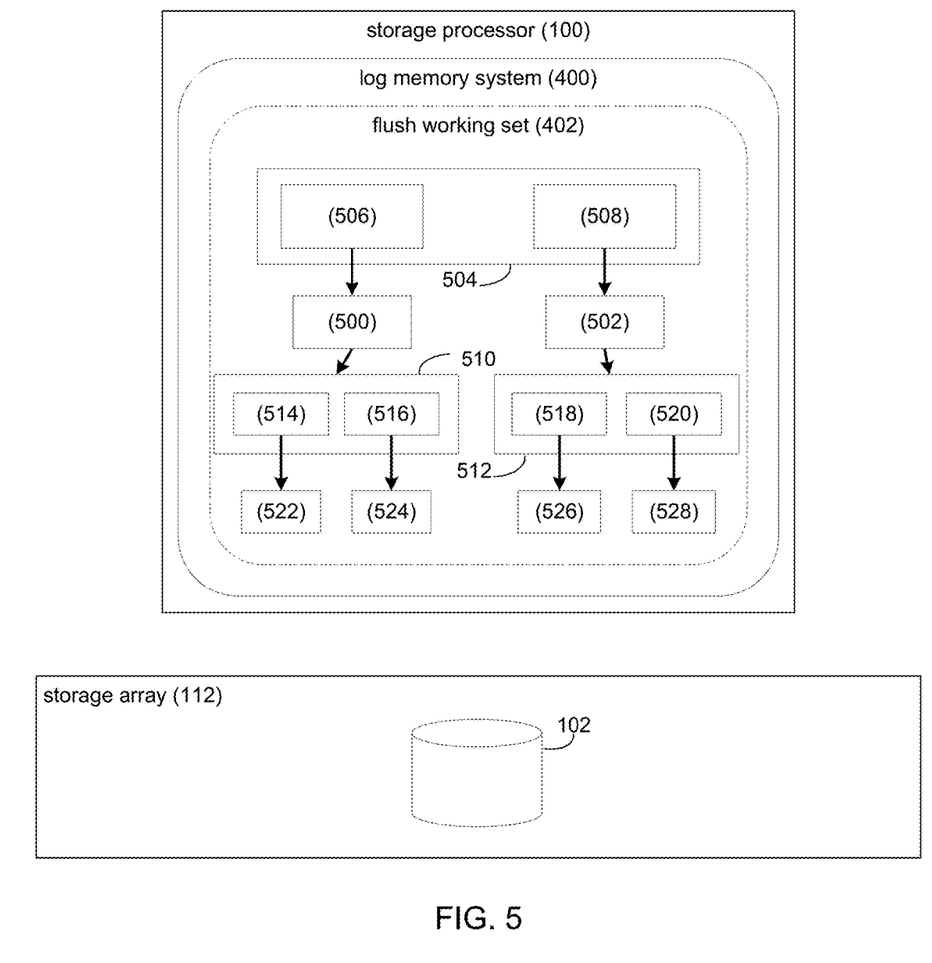
FIG. 5 is an example diagrammatic view of a flushing work set according to example implementations of the disclosure.

Referring also to FIG. 5, flush working set 402 may include a plurality of extent storage objects (e.g., extent storage objects 500, 502) managed by an extent hash table (e.g., extent hash table 504). An extent storage object is a storage object that holds a plurality of leaf storage objects and may be associated with a storage object. Storage objects may generally include any container or storage unit configured to store data within a storage system (e.g., storage system 12). For example, a storage object may be any one of the following: a volume (aka Logical Unit Number (LUN)), a file, or parts thereof that may be defined e.g. by offsets or address ranges (e.g., sub-LUNs, disk extents, and/or slices). In some implementations, extent hash table 504 is a hash table that manages each extent storage object of the flushing working set in one or more buckets (e.g., buckets 506, 508).

In some implementations, each extent storage object includes a leaf hash table and a plurality of containers. A leaf hash table (e.g., leaf hash tables 510, 512) is a hash table that manages each container of the flushing working set in one or more buckets (e.g., buckets 514, 516, 518, 520). A container (e.g., containers 522, 524, 526, 528) is a page list that is defined by a contiguous logical block address (LBA) range. Logged pages to be flushed that belong to the same LBA range are linked to the same container.

Figure 6:
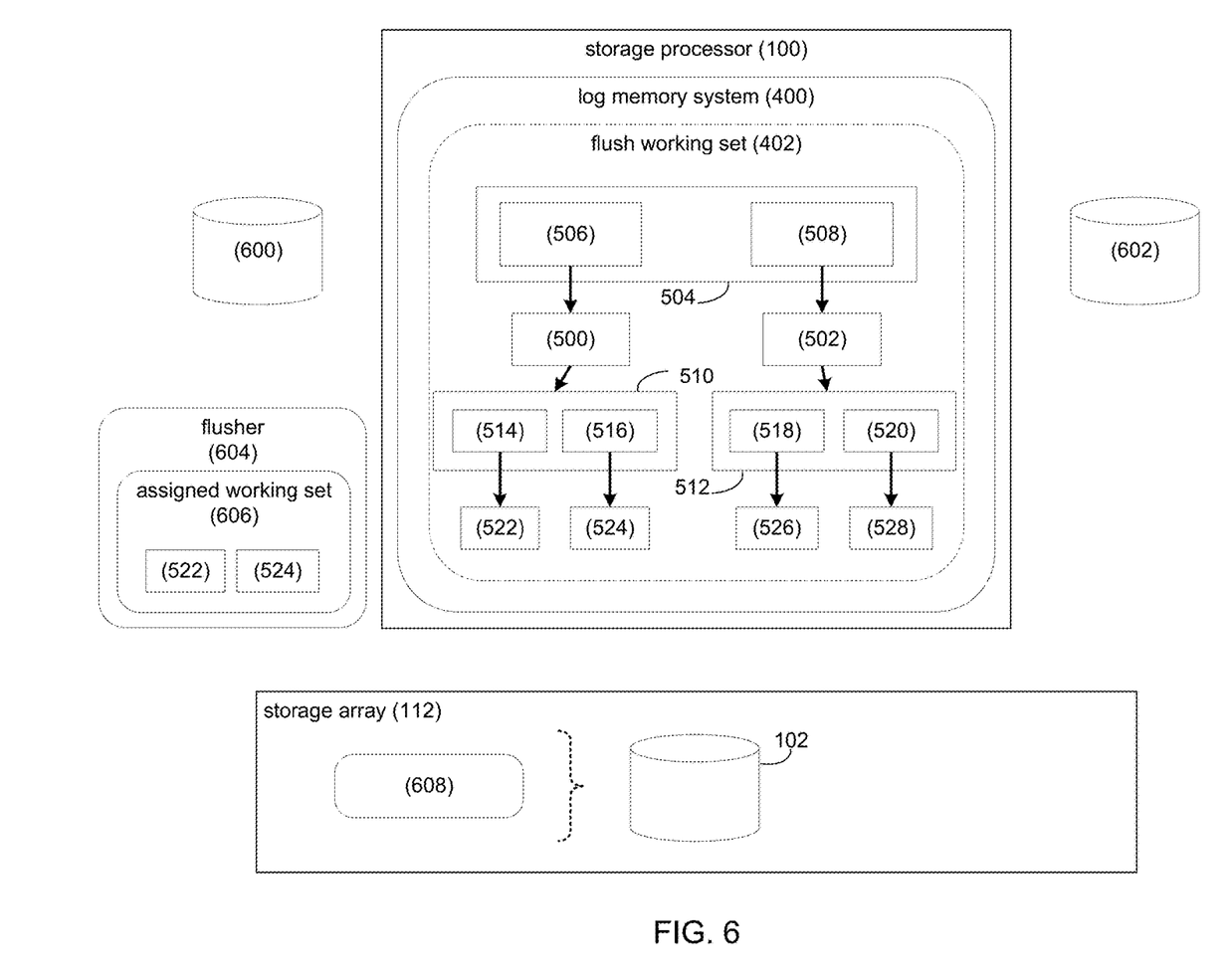
FIG. 6 is an example diagrammatic view of the adaptive flushing process according to one or more example implementations of the disclosure.

Referring also to FIG. 6 and in some implementations, each container (e.g., containers 522, 524, 526, 528) may be associated with a storage object. For example, containers 522 and 524 may include pages associated with one storage object (e.g., storage object 600) and containers 526 and 528 may include pages associated with another storage object (e.g., storage object 602). In one example, storage objects 600, 602 are volumes accessible or visible to host 406 using storage processor 100.

Figure 3:
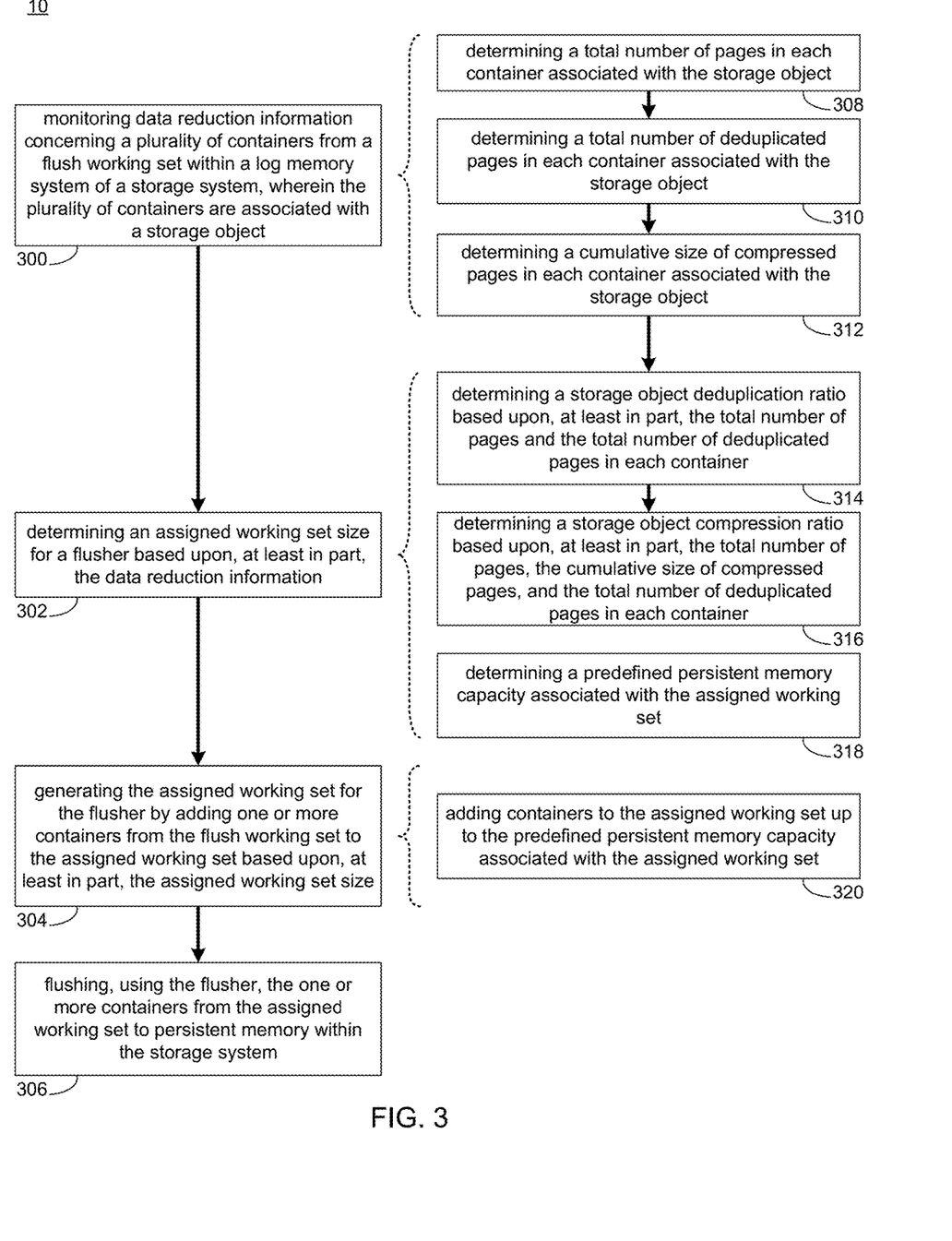
FIG. 3 is an example flowchart of the adaptive flushing process according to one or more example implementations of the disclosure.

In some implementations, adaptive flushing process 10 may monitor 300 data reduction information concerning a plurality of containers from a flush working set within a log memory system of a storage system, wherein the plurality of containers are associated with a storage object. For example, data reduction information may include information associated with the deduplication and/or compression of pages within a container when flushing the container to persistent storage of the storage system. In some implementations, adaptive flushing process 10 may monitor 300 data reduction information for each container associated with a particular storage object. For example, suppose that containers 522 and 524 are associated with volume 600. In this example, each container may experience similar data reduction processing (i.e., deduplication and/or compression of pages) when flushing pages of each container to persistent storage. For example, suppose volume 600 is highly compressible (e.g., a compressible ratio of 4:1). Accordingly, each of containers 522 and 524 may experience high compression. However, suppose containers 526 and 528 are associated with volume 602. In this example, suppose volume is uncompressible. Accordingly, containers 526 and 528 may experience very different data reduction than containers 522 and 524 when flushing pages to persistent storage. In this manner, adaptive flushing process 10 may monitor 300 data reduction information for a plurality of containers on a per-storage object basis. In the example of FIG. 6, adaptive flushing process 10 may monitor 300 data reduction information for containers 522 and 524 associated with volume 600 and data reduction information for containers 526 and 528 associated with volume 602.

In some implementations, monitoring 300 the data reduction information concerning the plurality of containers may include determining 308 a total number of pages in each container associated with the storage object. For example, adaptive flushing process 10 may determine 308 the total number of pages in each container related to a particular storage object before a flush working set is frozen. As will be discussed in greater detail below, the total number of pages in each container associated with a particular storage object may be used to determine a deduplication ratio and/or a compression ratio for the container. Suppose, for example purposes only, that container 522 includes e.g., 100 pages associated with storage object 600. In this example, adaptive flushing process 10 may determine 308 that container 522 has a total number of 100 pages. In some implementations, adaptive flushing process 10 may maintain, per container, a counter associated with the total number of pages for that container.

In some implementations, monitoring 300 the data reduction information concerning the plurality of containers may include determining 310 a total number of deduplicated pages in each container associated with the storage object. For example, adaptive flushing process 10 may determine 310 the total number of deduplicated pages in each container related to a particular storage object before a flush working set is frozen. As will be discussed in greater detail below, the total number of deduplicated pages in each container associated with a particular storage object may be used to determine a deduplication ratio and/or a compression ratio for the container. Suppose, for example purposes only, that container 522 includes e.g., 10 pages associated with storage object 600. In this example, adaptive flushing process 10 may determine 310 that container 522 has a total number of 10 deduplicated pages. In some implementations, adaptive flushing process 10 may maintain, per container, a counter associated with the total number of deduplicated pages for that container.

In some implementations, monitoring 300 the data reduction information concerning the plurality of containers may include determining 312 a cumulative size of compressed pages in each container associated with the storage object.

For example, adaptive flushing process 10 may determine 312 the cumulative size of compressed pages (i.e., the resulting size of compressed pages following compression operations) in each container related to a particular storage object before a flush working set is frozen. As will be discussed in greater detail below, the cumulative size of compressed pages in each container associated with a particular storage object may be used to determine a compression ratio for the container. Suppose, for example purposes only, that container 522 includes a cumulative size of e.g., 128 kilobytes of compressed pages associated with storage object 600. In this example, adaptive flushing process 10 may determine 312 that container 522 includes a cumulative size of 36 kilobytes of compressed pages. In some implementations, adaptive flushing process 10 may maintain, per container, a counter associated with the cumulative size of pages for that container.

In some implementations, adaptive flushing process 10 may determine 302 an assigned working set size for a flusher based upon, at least in part, the data reduction information. An assigned working set may include a portion of the flush working set assigned to a particular a flusher. The assigned working set size is the capacity (e.g., in terms of memory capacity, number of containers, number of pages, etc.) for an assigned working set. A flusher may generally include a software module configured to process containers from the flush working set and flush the containers to a particular destination in persistent memory. As shown in FIG. 6, a flusher (e.g., flusher 604) may be used to process containers for flushing from an assigned working set (e.g., assigned working set 606) to persistent memory. As will be discussed in greater detail below, each flusher (e.g., flusher 604) may be assigned to flush their assigned working set (e.g., assigned working set 606) to a particular portion of persistent memory. Determining the assigned working set size may include determining the number of containers and/or total storage capacity of containers from the flush working set to assign to a particular flusher. As will be discussed in greater detail below, the number of containers may be a function of the number of pages of each container and the data reduction available for the pages of each container. Accordingly, adaptive flushing process 10 may use the data reduction information associated with each storage object (e.g., total number of pages for each container associated with the storage object; total number of deduplicated pages for each container associated with the storage object; and the cumulative size of compressed pages in each container that are associated with the storage object) to adapt the assigned working set size for each flusher. In this manner, adaptive flushing process 10 may account for distinct data reduction properties for each storage object.

In some implementations, determining 302 an assigned working set size for a flusher based upon, at least in part, the data reduction information may include determining 314 the storage object deduplication ratio based upon, at least in part, the total number of pages and the total number of deduplicated pages in each container; and determining 316 a storage object compression ratio based upon, at least in part, the total number of pages, the cumulative size of compressed pages, and the total number of deduplicated pages in each container. For example, when a flush working set is frozen, adaptive flushing process 10 may monitor for the above-described data reduction information (e.g., total number of pages for each container associated with the storage object; total number of deduplicated pages for each container associated with the storage object; and the cumulative size of compressed pages in each container that are associated with the storage object) to generate data reduction ratios for the storage object. In some implementations, the data reduction ratios for the storage object may be determined for each container associated with a particular storage object.

In some implementations, adaptive flushing process 10 may determine 314 the storage object deduplication ratio based upon, at least in part, the total number of pages and the total number of deduplicated pages in each container. For example, adaptive flushing process 10 may determine a storage object deduplication ratio (e.g., actual deduplication ratio of the storage object's data). The storage object deduplication ratio may be determined as shown below in Equation 1:

$$DR = \text{pages}_{total}/\text{pages}_{deduplicated} \quad (1)$$

where "DR" is the storage object deduplication ratio, $\text{pages}_{total}$ is the total number of pages for the container associated with the storage object, and $\text{pages}_{deduplicated}$ is the total number of deduplicated pages for the container associated with the storage object.

In some implementations, adaptive flushing process 10 may determine 316 a storage object compression ratio based upon, at least in part, the total number of pages, the cumulative size of compressed pages, and the total number of deduplicated pages in each container. For example, adaptive flushing process 10 may determine a storage object deduplication ratio (e.g., actual deduplication ratio of the storage object's data). The storage object compression ratio may be determined as shown below in Equation 2:

$$CR = ((\text{pages}_{total} - \text{pages}_{deduplicated}) * (\text{page\_size}))/\text{comp\_size} \quad (2)$$

where "CR" is the storage object compression ratio, $\text{pages}_{total}$ is the total number of pages for the container associated with the storage object, $\text{pages}_{deduplicated}$ is the total number of deduplicated pages for the container associated with the storage object, and comp_size is the cumulative size of compressed pages in the container that are associated with the storage object.

In some implementations, adaptive flushing process 10 may use the storage object deduplication ratio and/or the storage object compression ratio to determine the assigned working set size for assigned working set 606. For example, suppose adaptive flushing process 10 determines 314 that container 522 has a total number of 100 pages, a total number of 10 deduplicated pages, and a cumulative size of 36 kilobytes of compressed pages. In this example, adaptive flushing process 10 may determine 314 the storage object deduplication ratio to be 100/10=10:1 and may determine 316 the storage object compression ratio to be e.g., 100–10*4 kilobytes/36 kilobytes=90*4/36=10:1. Accordingly, adaptive flushing process 10 may determine, for each container of flush working set 402, a number of containers to assign or add to the assigned working set (e.g., assigned working set 606) of flusher 604.

In some implementations, determining 302 the assigned working set size for the flusher may include determining 318 a predefined persistent memory capacity associated with the assigned working set. For example and as discussed above, each flusher may be assigned a predefined persistent memory capacity for flushing the containers of assigned working set to. A predefined persistent memory capacity may include a predefined amount of memory capacity from the persistent storage. For example, the predefined persistent memory capacity may include a RAID stripe of fixed size defined by RAID architecture. In one example, the predefined persistent memory capacity is two megabytes for writing unique data. However, it will be appreciated that various predefined persistent memory capacities may be used within the scope of the present disclosure. Referring again to FIG. 6, adaptive flushing process 10 may allocate a predefined persistent memory capacity (e.g., predefined persistent memory capacity 608) for flushing containers from assigned working set 606 of flusher 604.

As discussed above, conventional approaches for flushing working sets to the persistent memory may include overfilling the working set or underfilling the working set. For example, when a working set includes more pages than can be stored in the persistent memory capacity, adaptive flushing process 10 may provide unflushed containers back to the flush working set of the log memory system to be reassigned to another flusher. However, this approach wastes computing resources and prolongs flushing time. As will be discussed in greater detail below, with the assigned working set size determined by calculating the storage object deduplication ratio and/or the storage object compression ratio for a particular storage object, adaptive flushing process 10 may provide adaptive flushing that accounts for variations in storage objects in terms of data reduction characteristics unique to each storage object.

In some implementations, adaptive flushing process 10 may generate 304 the assigned working set for the flusher by adding one or more containers from the flush working set to the assigned working set based upon, at least in part, the assigned working set size. For example, adaptive flushing process 10 may iterate through the plurality of containers of the flush working set to determine whether to add each respective container to the assigned working set based upon, at least in part, the assigned working set size. In some implementations, generating 304 the assigned working set for the flusher includes detaching a particular container from the flush working set and adding the container to the assigned working set of the flusher. For example, suppose adaptive flushing process 10 determines an assigned working set size for assigned working set 606 for flusher 604 for flushing containers associated with storage object 600 to persistent storage (e.g., predefined persistent memory capacity 608). In this example, adaptive flushing process 10 may add containers from flush working set 402 until the capacity of assigned working set 606 is full or as full as possible (e.g., relative to some threshold) based upon, at least in part, the assigned working set size. For instance, suppose that the assigned working set size indicates that assigned working set may include each page of container 522 associated with storage object 600. In this example, adaptive flushing process 10 may generate assigned working set 606 by adding container 522. Further, assume that adaptive flushing process 10 determines that assigned working set may further the pages of container 524 associated with storage object 600. In this example, adaptive flushing process 10 may continue to iterate through containers from the flush working set until the assigned working set size is achieved or most nearly achieved (i.e., until assigned working set 606 is full or as full as possible).

In some implementations, generating 304 the assigned working set for the flusher may include adding 320 containers to the assigned working set up to the predefined persistent memory capacity associated with the assigned working set. For example and as discussed above, the amount of pages that may be flushed from an assigned working set may be limited by the predefined persistent memory capacity of the storage array. For example, suppose predefined persistent memory capacity 608 is a two megabyte RAID stripe. In this example, adaptive flushing process 10 may generate 304 assigned working set 606 for flusher 604 by adding 320 containers up to or until the assigned working set size equals or is as close as possible to predefined persistent memory capacity 608 as possible without exceeding predefined persistent memory capacity 608. In this manner, adaptive flushing process 10 may ensure that flusher 604 does not waste computing resources by over-assigning containers from flush working set 402 to assigned working set 606. In this example, adaptive flushing process 10 may add containers until assigned working set 606 has two megabytes or as close to two megabytes as possible without exceeding two megabytes.

In some implementations, adaptive flushing process 10 may flush 306, using the flusher, the one or more containers from the assigned working set to persistent memory within the storage system. For example, adaptive flushing process 10 may use flusher 604 to flush 306 or write the pages of the one or more containers (e.g., containers 522, 524) added to assigned working set 606 to predefined persistent memory capacity 608. As shown in FIG. 6, predefined persistent memory capacity 608 may be a portion of a persistent storage device (e.g., storage target 102) of storage array 112.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    monitoring data reduction information concerning a plurality of containers from a flush working set within a log memory system of a storage system, wherein the plurality of containers are associated with a storage object;
    determining an assigned working set size for a flusher based upon, at least in part, the data reduction information;
    generating the assigned working set for the flusher by adding one or more containers from the flush working set to the assigned working set based upon, at least in part, the assigned working set size; and
    flushing, using the flusher, the one or more containers from the assigned working set to persistent memory within the storage system.

2. The computer-implemented method of claim 1, wherein monitoring the data reduction information concerning the plurality of containers includes determining a total number of pages in each container associated with the storage object.

3. The computer-implemented method of claim 2, wherein monitoring the data reduction information concerning the plurality of containers includes determining a total number of deduplicated pages in each container associated with the storage object.

4. The computer-implemented method of claim 3, wherein monitoring the data reduction information concerning the plurality of containers includes determining a cumulative size of compressed pages in each container associated with the storage object.

5. The computer-implemented method of claim 4, wherein determining the assigned working set size for the flusher includes:
   determining a storage object deduplication ratio based upon, at least in part, the total number of pages and the total number of deduplicated pages in each container; and
   determining a storage object compression ratio based upon, at least in part, the total number of pages, the cumulative size of compressed pages, and the total number of deduplicated pages in each container.

6. The computer-implemented method of claim 1, wherein determining the assigned working set size for the flusher includes determining a predefined persistent memory capacity associated with the assigned working set.

7. The computer-implemented method of claim 6, wherein generating the assigned working set for the flusher includes adding containers to the assigned working set up to the predefined persistent memory capacity associated with the assigned working set.

8. A computer program product residing on a non-transitory computer readable medium having a plurality of instructions stored thereon which, when executed by a processor, cause the processor to perform operations comprising:
   monitoring data reduction information concerning a plurality of containers from a flush working set within a log memory system of a storage system, wherein the plurality of containers are associated with a storage object;
   determining an assigned working set size for a flusher based upon, at least in part, the data reduction information;
   generating the assigned working set for the flusher by adding one or more containers from the flush working set to the assigned working set based upon, at least in part, the assigned working set size; and
   flushing, using the flusher, the one or more containers from the assigned working set to persistent memory within the storage system.

9. The computer program product of claim 8, wherein monitoring the data reduction information concerning the plurality of containers includes determining a total number of pages in each container associated with the storage object.

10. The computer program product of claim 9, wherein monitoring the data reduction information concerning the plurality of containers includes determining a total number of deduplicated pages in each container associated with the storage object.

11. The computer program product of claim 10, wherein monitoring the data reduction information concerning the plurality of containers includes determining a cumulative size of compressed pages in each container associated with the storage object.

12. The computer program product of claim 11, wherein determining the assigned working set size for the flusher includes:
   determining a storage object deduplication ratio based upon, at least in part, the total number of pages and the total number of deduplicated pages in each container; and
   determining a storage object compression ratio based upon, at least in part, the total number of pages, the cumulative size of compressed pages, and the total number of deduplicated pages in each container.

13. The computer program product of claim 8, wherein determining the assigned working set size for the flusher includes determining a predefined persistent memory capacity associated with the assigned working set.

14. The computer program product of claim 13, wherein generating the assigned working set for the flusher includes adding containers to the assigned working set up to the predefined persistent memory capacity associated with the assigned working set.

15. A computing system comprising:
   a memory; and
   a processor configured to monitor data reduction information concerning a plurality of containers from a flush working set within a log memory system of a storage system, wherein the plurality of containers are associated with a storage object, wherein the processor is further configured to determine an assigned working set size for a flusher based upon, at least in part, the data reduction information, wherein the processor is further configured to generate the assigned working set for the flusher by adding one or more containers from the flush working set to the assigned working set based upon, at least in part, the assigned working set size, and wherein the processor is further configured to flush, using the flusher, the one or more containers from the assigned working set to persistent memory within the storage system.

16. The computing system of claim 15, wherein monitoring the data reduction information concerning the plurality of containers includes determining a total number of pages in each container associated with the storage object.

17. The computing system of claim 16, wherein monitoring the data reduction information concerning the plurality of containers includes determining a total number of deduplicated pages in each container associated with the storage object.

18. The computing system of claim 17, wherein monitoring the data reduction information concerning the plurality of containers includes determining a cumulative size of compressed pages in each container associated with the storage object.

19. The computing system of claim 18, wherein determining the assigned working set size for the flusher includes:
   determining a storage object deduplication ratio based upon, at least in part, the total number of pages and the total number of deduplicated pages in each container; and
   determining a storage object compression ratio based upon, at least in part, the total number of pages, the cumulative size of compressed pages, and the total number of deduplicated pages in each container.

20. The computing system of claim 19, wherein determining the assigned working set size for the flusher includes determining a predefined persistent memory capacity associated with the assigned working set.

* * * * *